April 19, 1960

E. P. LARSH 2,932,992

GEARED POWER TRANSMISSION AND METHOD OF
INCREASING THE LOAD CARRYING
CAPACITY OF GEARS

Filed Oct. 8, 1956

INVENTOR
EVERETT P. LARSH

By Taulmin & Taulmin

Attorneys

April 19, 1960 E. P. LARSH 2,932,992
GEARED POWER TRANSMISSION AND METHOD OF
INCREASING THE LOAD CARRYING
CAPACITY OF GEARS
Filed Oct. 8, 1956 8 Sheets-Sheet 4

INVENTOR
EVERETT P. LARSH
BY
ATTORNEYS

INVENTOR
EVERETT P. LARSH
BY Toulmin & Toulmin
ATTORNEYS

April 19, 1960
E. P. LARSH
2,932,992
GEARED POWER TRANSMISSION AND METHOD OF
INCREASING THE LOAD CARRYING
CAPACITY OF GEARS
Filed Oct. 8, 1956
8 Sheets-Sheet 6
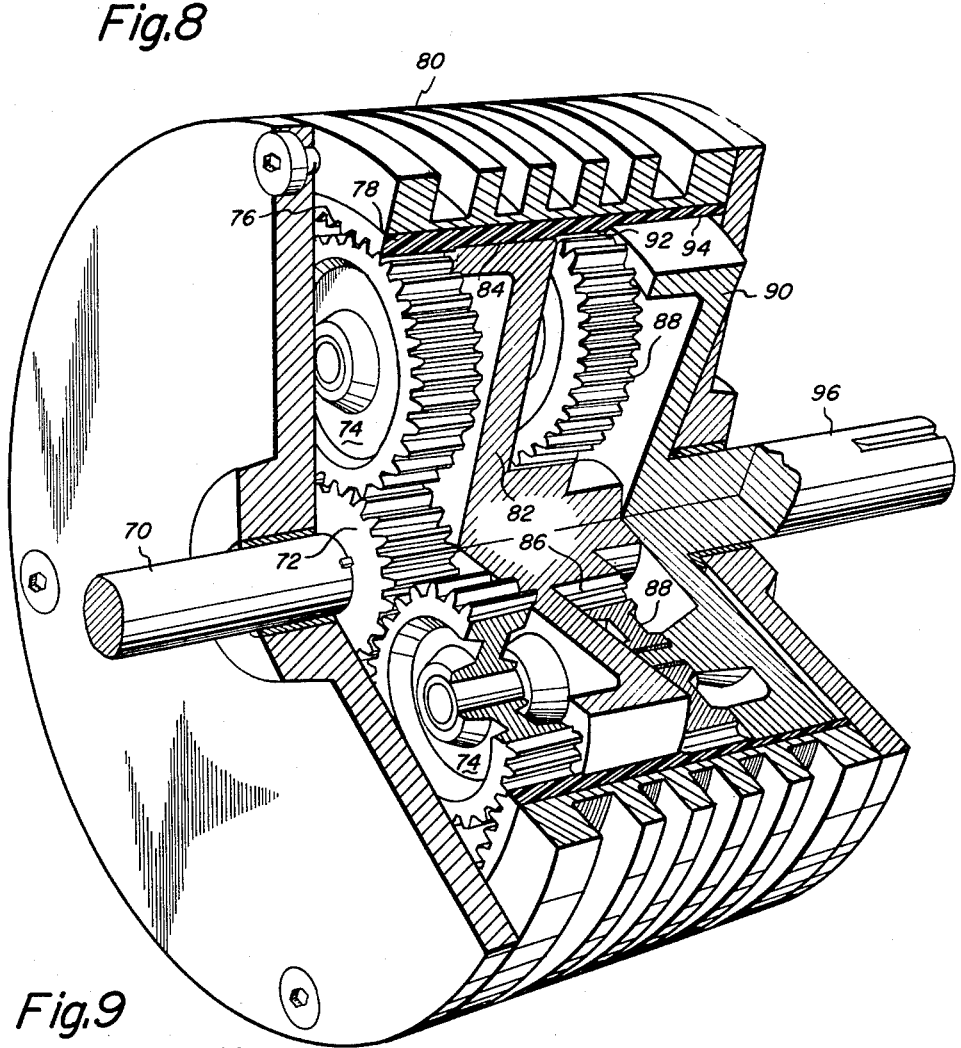
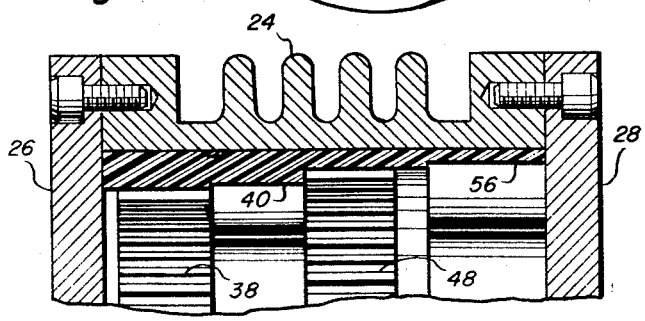
INVENTOR
EVERETT P. LARSH
By *Taulmin & Taulmin*
Attorneys April 19, 1960

E. P. LARSH 2,932,992

GEARED POWER TRANSMISSION AND METHOD OF
INCREASING THE LOAD CARRYING
CAPACITY OF GEARS

Filed Oct. 8, 1956

INVENTOR

EVERETT P. LARSH

By *Taulmin & Taulmin*

Attorneys

United States Patent Office 2,932,992
Patented Apr. 19, 1960

2,932,992

GEARED POWER TRANSMISSION AND METHOD OF INCREASING THE LOAD CARRYING CAPACITY OF GEARS

Everett P. Larsh, Dayton, Ohio

Application October 8, 1956, Serial No. 614,542

10 Claims. (Cl. 74—804)

This invention relates to power transmission units, particularly to geared power transmission units for positively transmitting power from an input shaft to an output shaft.

More particularly still, this invention relates to a power transmission unit for effecting high speed reductions, as from a high speed electric motor shaft to an output shaft of only a few revolutions per minute.

Power transmission devices of the speed increasing and the speed reduction types are well known, and it is also known to make such transmissions positive by utilizing gears. It is also known to construct such power transmissions integrally with electric motors, or adapted for direct association with electric motors, as, for example, in the case of geared head motors or electric motors having directly connected therewith a geared power transmission unit.

Heretofore extremely large reductions have been accomplished by utilizing multiple spur gear stepdown arrangements, or by using worm and wheel speed reducers, or combinations thereof. The usual multiple spur gear speed reducing unit is relatively expensive and is not usually employed where the speed ratio between the input shaft and the output shaft extends a predetermined amount.

For all very large speed reductions it is customary to employ a worm and wheel and, while an arrangement of this type is satisfactory so far as the change in speed is concerned, there is inherently a loss of power due to rubbing friction between the worm and wheel, and which rubbing friction also leads to wear, particularly in the event of overload. Once this wear is started on the worm and wheel set, such a gear unit will ordinarily fail within a short time.

Having the foregoing in mind, it is a primary object of the present invention to construct a power transmission unit, particularly a power transmission unit adapted for large speed reductions in which the drawbacks encountered with conventional units referred to above are avoided.

A further object of the present invention is the provision of a high ratio speed reducing transmission unit in which well known efficient spur gears can be employed while still providing extremely compact and simple structures.

Another object of the present invention is the provision of a power transmission unit which transmits positively and which is capable of being constructed to cover a wide range of speed ratios between the input and output shaft without changing the outside dimensions of the unit.

A still further object of the present invention is the provision of a power transmission unit capable of extremely large speed reductions from the input shaft to the output shaft in which spur gears are utilized, but in which high local stresses in the teeth of the gears are reduced, thereby reducing the wear that takes place on the spur gear and reducing the possibility of breakage, and promoting efficient operation thereof.

A particular object of the present invention is to provide a geared power transmission unit in which the inherent resilience of a material is employed for modifying the characteristics of a spur gear combination, including at least one gear made of the said material, whereby the gears will carry greater loads than was formerly possible.

A still further particular object of the present invention is the provision of a new method of constructing geared units, particularly spur gears, such that greater load-carrying characteristics and longer life and higher shock resistance of the gear arrangement is had.

In general, the practice of the present invention involves the use of a gear molded or cast or shaped in some manner from an elastic, or semi-elastic, plastic material. This gear is preferably an internal gear and may be cast or molded in situ within a metal gear case so as to be integrally and rigidly bonded thereto.

When a gear of this nature is engaged with an external gear a conventional relationship between the gears will exist, except that the internal gear will be of a resilient nature whereby there will be a slight yielding of the gear teeth upon loading thereof so the load will be distributed over several adjacent teeth, thereby reducing the stresses in the teeth that would normally carry the entire load and giving the gear arrangement greater load-carrying characteristics and greater shock resistance.

Preferably, in one form which my invention can take I employ a combination of an epicyclic and planetary gearing, and in another form I employ a combination of planetary gear sets; in each case effecting a large speed reduction.

I contemplate employing my invention as a straight speed reducing unit to reduce the speed, for example, of an electric motor output shaft, or for reducing the speeds of other shafts, as in connection with machine tools and the like, and a particular application which I contemplate of the present invention is its adaptation to the driving wheels of a vehicle wherein an electric motor is coupled with a vehicle wheel via a speed reducing unit according to the present invention.

In certain forms which my invention can take the possibility exists of including within the construction a relatively simple speed-changing mechanism which could consist of a clutch for selectively locking up or releasing a planetary gear set forming a part of the speed reducer of the present invention.

The exact nature of my invention, and the manner in which the various objectives referred to above are attained, will become apparent upon referring to the following specification taken in connection with the accompanying drawings, in which:

Figure 8 is a perspective view showing a modified construction according to my invention utilizing two planetary gear sets between the input shaft and the output shaft;

Figure 9 is a longitudinal sectional view through the housing of the Figure 3 modification showing the manner in which the molded-in member forming the internal gears is disposed within the case of the unit;

Figure 1:
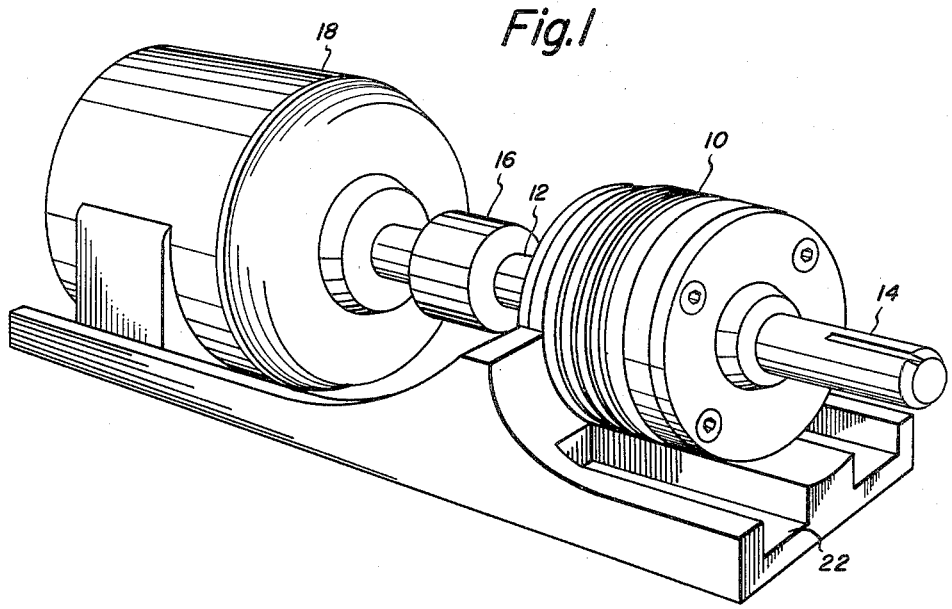
Figure 1 is a perspective view showing a speed reducing unit according to the present invention associated with an electric driving motor connected with the input shaft.
Figure 2:
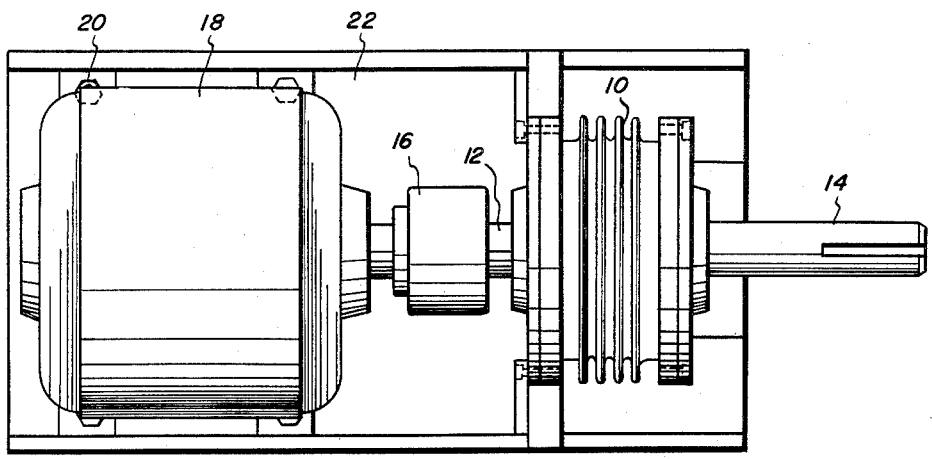
Figure 2 is a plan view showing the motor and power transmission unit of Figure 1.

Referring to the drawings somewhat more in detail, Figures 1 and 2 show elevational views of a typical arrangement that might be made according to my invention. In these figures there is a speed reducer unit 10 having an input shaft 12 and an output shaft 14. Input shaft 12 is connected by coupling 16 with the output shaft of an electric motor 18. Motor 18 is bolted as at 20 to a platform 22. The speed reducer unit 10 may be formed as an integral part of platform 22, thus making it possible to form a motor-speed reducer as a substantially conventional assembly.

Figure 3:
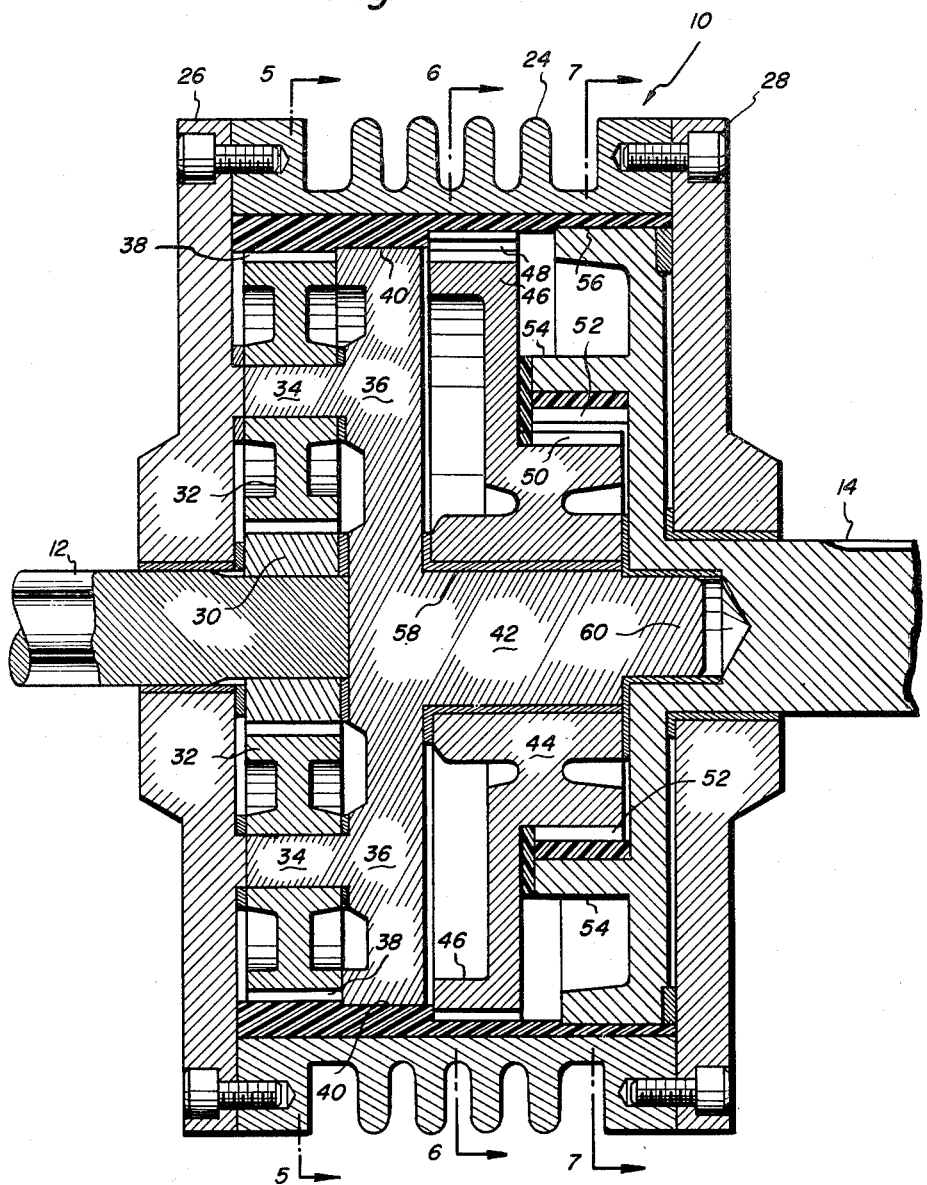
Figure 3 is a vertical sectional view showing one form which my invention can take utilizing a planetary gear set and two epicyclic gear sets for reducing the speed of the input shaft to that of the output shaft.
Figure 4:
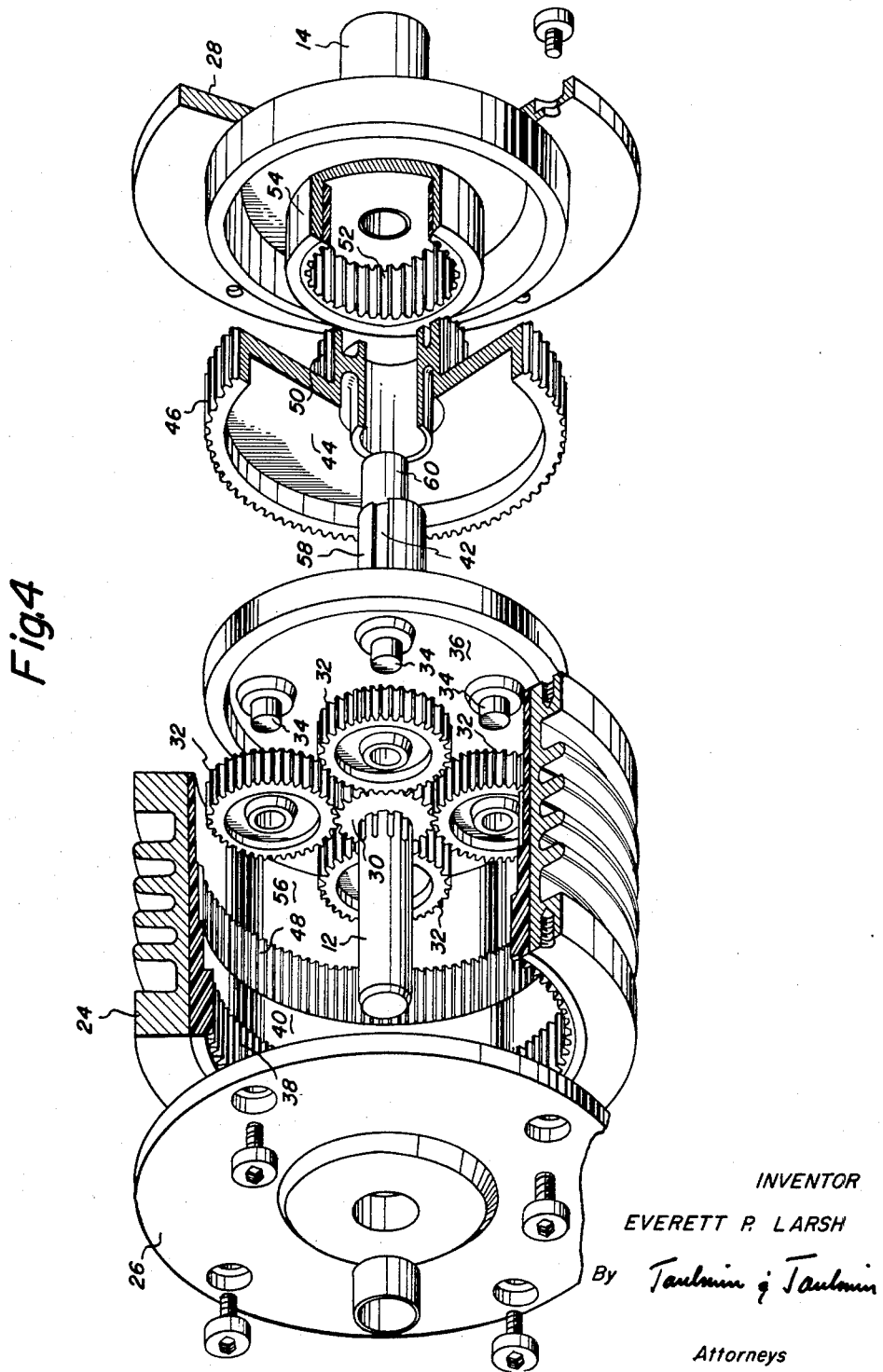
Figure 4 is an exploded perspective view of the Figure 3 arrangement.

One form which the speed reducer unit of Figures 1 and 2 might take is illustrated in Figure 3, wherein the speed reducer will be seen to comprise a case 24 having an end cover 26 at the input end and an end cover 28 at the output end. Input shaft 12 is splined to a sun gear 30 that meshes with a plurality of planet gears 32 which are rotatably supported on the shaft portions 34 of a planet carrier 36. Planet gears 32 mesh with a ring gear 38 fixed within case 24. Planet carrier 36 has an outside diameter at least slightly greater than the overall distance across the planet gears 32, and is arranged to take a bearing in the cylindrical portion 40 of the insert, of which the aforementioned ring gear 38 is an integral part.

The planet carrier 36 comprises a shaft portion 42 eccentric to the axis of rotation of planet carrier 36. The eccentricity of shaft 42 is availed of for supporting the compound external gear 44 of a pair of epicyclic gear sets. The larger of the epicyclic gears at 46 meshes with a large internal gear portion 48 which is an integral part of the member that comprises the internal gear 38 and cylindrical portion 40 previously referred to.

A smaller one of the external gears at 50 is arranged to mesh with a smaller internal gear at 52 carried by the short cylindrical member 54 which is integral with the output shaft 14. The short cylindrical member 54 takes a bearing in the cylindrical outer end part 56 of the member that also makes up internal gears 38 and 48 and cylindrical bearing portion 40.

The member making these said internal gears and the said cylindrical bearing portions is a plastic material characterized in being slightly resilient, and this element may advantageously be cast or molded in place within case 24. A number of plastic materials suggest themselves for the purpose of making up a slightly resilient internal gear member, and among these plastic materials is nylon which is extremely strong and which has high wear resistance and which can be closely controlled with regard to its elastic properties.

The internal gear 52 is likewise formed in the same manner by being molded or cast in place within a cylindrical flange extending backwardly off member 54 encircling a smaller external gear 50 and having the same eccentricity relative thereto as the internal gear 48 has relative to the larger external gear 46.

The rotating parts of the transmission are supported on bearings and parts which are either spaced or separated by bearing elements, thereby reducing friction within the unit to a minimum and reducing wear. The casing can be substantially filled with a lubricant of the proper grade and the lubricant will last for an indefinite period, and there will be little or no leakage of the lubricant from the casing. In any event, if leakage does occur there will always be a reservoir of the lubricant which, due to the construction of the unit, will be kept in circulation within the unit and reach all parts thereof when the unit is in operation.

A particular feature of the speed reducing unit just described is the large speed reduction that can be obtained in a relatively small structure. For example, in the unit described speed reductions up to 2000 to 1 and greater can easily be had.

In operation, the input shaft 12 drives sun gear 30 and sun gear 30 drives planet gears 32 which roll about inside ring gear 38, thus carrying with them planet carrier 36. Planet carrier 36, by way of the eccentric shaft portion 42 thereof, causes the external compound gears 46 and 50 of the epicyclic gear sets to roll about inside their respective internal gears 48 and 50. The compound epicyclic external gears will be caused to rotate by the action of gears 46 and 48, and this rotation, together with the rotative effect imparted to external gear 52 by gear 50, will cause the member 54 to rotate thereby to drive shaft 14.

The external gears of the epicyclic gear sets have a large bearing 58 surrounding eccentric shaft portion 42 of the planet carrier, and the eccentric shaft portion 42 is, in turn, supported by a short shaft portion 60 at the outer end thereof that takes a bearing in the inner end of output shaft 14.

The described arrangement has the aforementioned extremely important characteristic of having flexible and yielding gear teeth, particularly where an internal gear is provided. The yielding nature of the internal gear permits some slight yielding of the loaded gear teeth, and in this manner more load-carrying teeth are added as the load increases. In this manner also the load on the output shaft may be increased without the danger of overloading the gear teeth and without causing any loss of efficiency of transmission of power. The yielding characteristic of the internal gears also tends to establish an artificial base line as the load increases and forces some slight deformation of the teeth.

It will be understood that under all normal conditions the yielding of the teeth will be quite minute, probably not more than ten-thousandths of an inch or so from one tooth to the next, but this amount of yielding is a highly important feature in absorbing shock loads which would otherwise be hazardous and would require the use of expensive oversized gear units.

It will also be apparent that the resilient feature is of advantage in reducing the noise of operation and, due to the increase in the strength that can be developed in internal gears, an extremely wide range of speed ratios is possible in a small compact structure.

It has been mentioned above that the internal gears are preferably of a resilient nature, but at the same time it will be understood that either of two mating gears can be made of a yieldable material in carrying out the practice of the present invention. In any case, however, the pair of gears, at least one of which is of a resilient nature, consist of the combination of an internal gear and an external gear.

Figure 10:
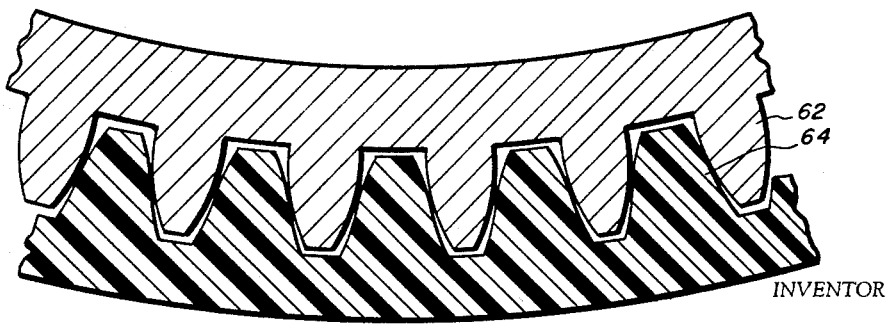
Figure 10 is an enlarged sectional view showing in detail the manner in which the rigid and resilient gear elements of the power unit of the present invention interengage.

The manner in which the teeth of a pair of gears mesh according to the present invention is illustrated in Figure 10, wherein the gear teeth 62 are formed on an external gear while an internal gear has the teeth 64. The external gear is made of metal and may be cast or formed by cutting or grinding, or may consist of a sintered metal powder. The internal gear is, as mentioned before, made of a resilient plastic material such as nylon. It will be evident, upon reference to Figure 10, that in the case of interengaging internal and external gears at least several teeth of the yieldable gear are available for carrying loads. While only a very few of these teeth are utilized in transmitting extremely light loads, as the loading on the transmission increases and the teeth deform slightly it will be evident that the load will be distributed amongst several active teeth.

Figure 5:
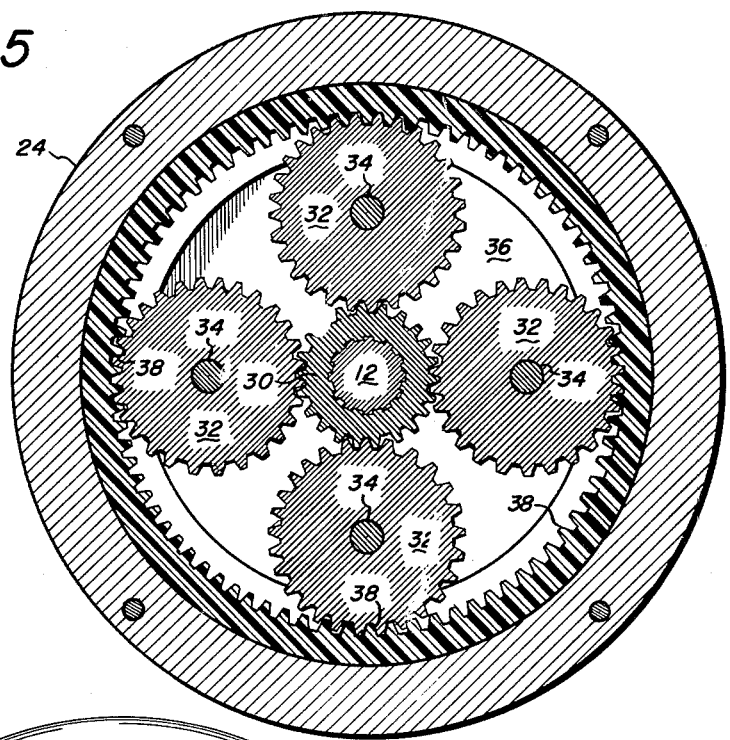
Figure 5 is a sectional view indicated by line 5—5 on Figure 3 showing the planetary gear set in the input end of the transmission unit.
Figure 6:
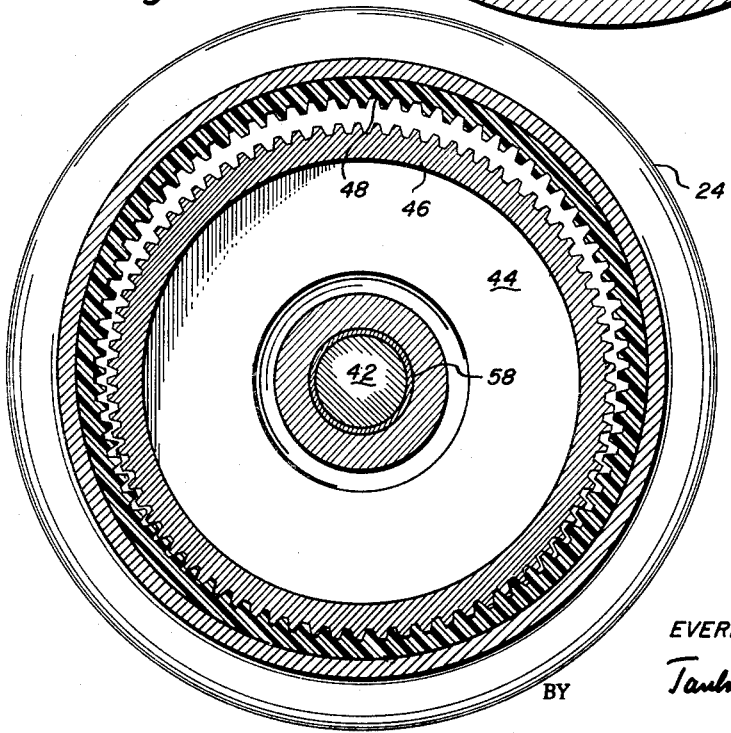
Figure 6 is a sectional view indicated by line 6—6 on Figure 3 showing the first epicyclic gear set of the transmission unit.
Figure 7:
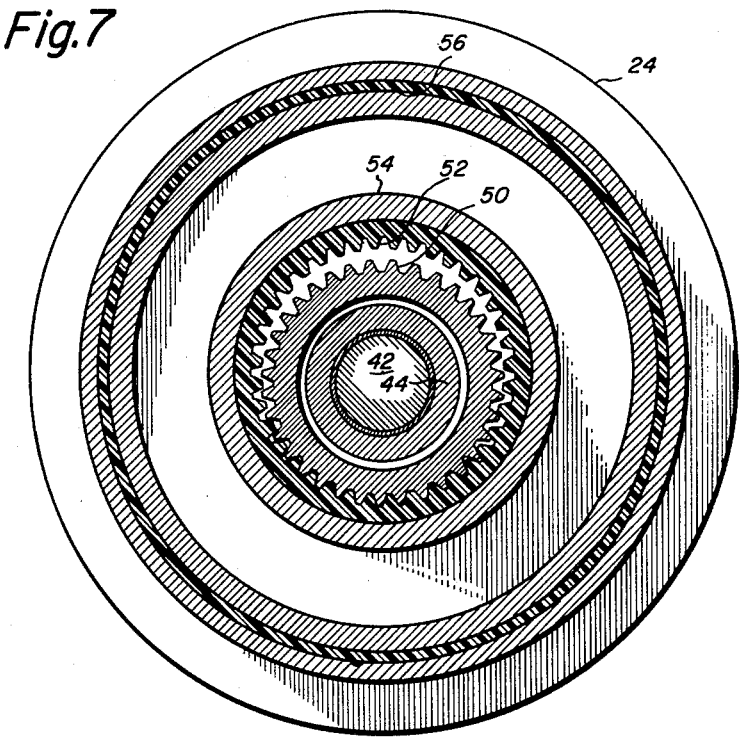
Figure 7 is a sectional view indicated by line 7—7 on Figure 1 showing the second epicyclic gear set of the transmission unit.

Reference to Figures 5, 6 and 7 will show that for large epicyclic gear sets, having a relatively small difference in diameter, almost 90° about the resilient gear may be considered to be effective under conditions of heavy loading. With the smaller diameter epicyclic gear set of Figure 7 there might be effective as much as 60° to 75° about the resilient gear. In the case of the Figure 5 arrangement, where the resilient internal gear is engaged by considerably smaller planet gears, the distribution of the load would be over about four or five teeth of the internal gear for each planet gear.

Reference to Figure 3 will reveal that the greatest tooth loading will occur in the epicyclic gear sets because this is the slowest speed portion of the transmission. As has been noted above, these portions of the transmission are those in which the distribution of the load is over the greatest number of teeth of the resilient gear. In forming the epicyclic gear sets the actual difference in the number of teeth of the internal and external gears may be varied considerably to obtain the speed reduction desired, and in the units about the range referred to in the present application differences of from 2 to 8 teeth have been employed. In the drawings, the eccentric gears of the two gear epicyclic sets would usually be much less than shown whereby an even greater portion of the teeth of the gears would be effective than referred to above.

The unit described above consists of a planetary gear set followed by two sets of epicyclic gears. However, many other arrangements of gearing according to the present invention can be made. One arrangement having certain features of practicality is illustrated in Figure 8 wherein there are two planetary gear sets arranged in series between the input shaft and the output shaft. In Figure 8 the input shaft 70 drives a sun gear 72 that meshes with pinions 74 running on internal gear portion 76 of a resilient insert 78 molded or cast within case 80. Planet pinions 74 are mounted on a carrier 82 that takes a bearing within a cylindrical portion 84 of the resilient member 78. The carrier 82 also has a sun gear portion 86 meshing with planet pinions 88 mounted on a carrier 90, and which planet pinions mesh with an internal gear portion 92 of the resilient member 78. Carrier 90 takes a bearing on a cylindrical portion 94 of the resilient member 78. Carrier 90 is attached to, or is integral with, an output shaft 96.

The degree of speed reduction shown in the Figure 8 modification is considerably less than that shown in the first described modification, but the same advantages obtain with respect to the distribution of the load imposed on the internal gears over a plurality of teeth thereof.

A particularly practical application of a speed reducing arrangement according to the present invention is in connection with the driving of the wheels or vehicles such as tractors. By way of illustration of this particular use of the transmission of my invention, there is shown in Figures 11 and 12 a new and novel combination of an electric drive motor, a geared speed reducing transmission, and a vehicle wheel formed as an integral unitary assembly and interrelated to produce an extremely compact highly efficient and unique structure.

Figure 11:
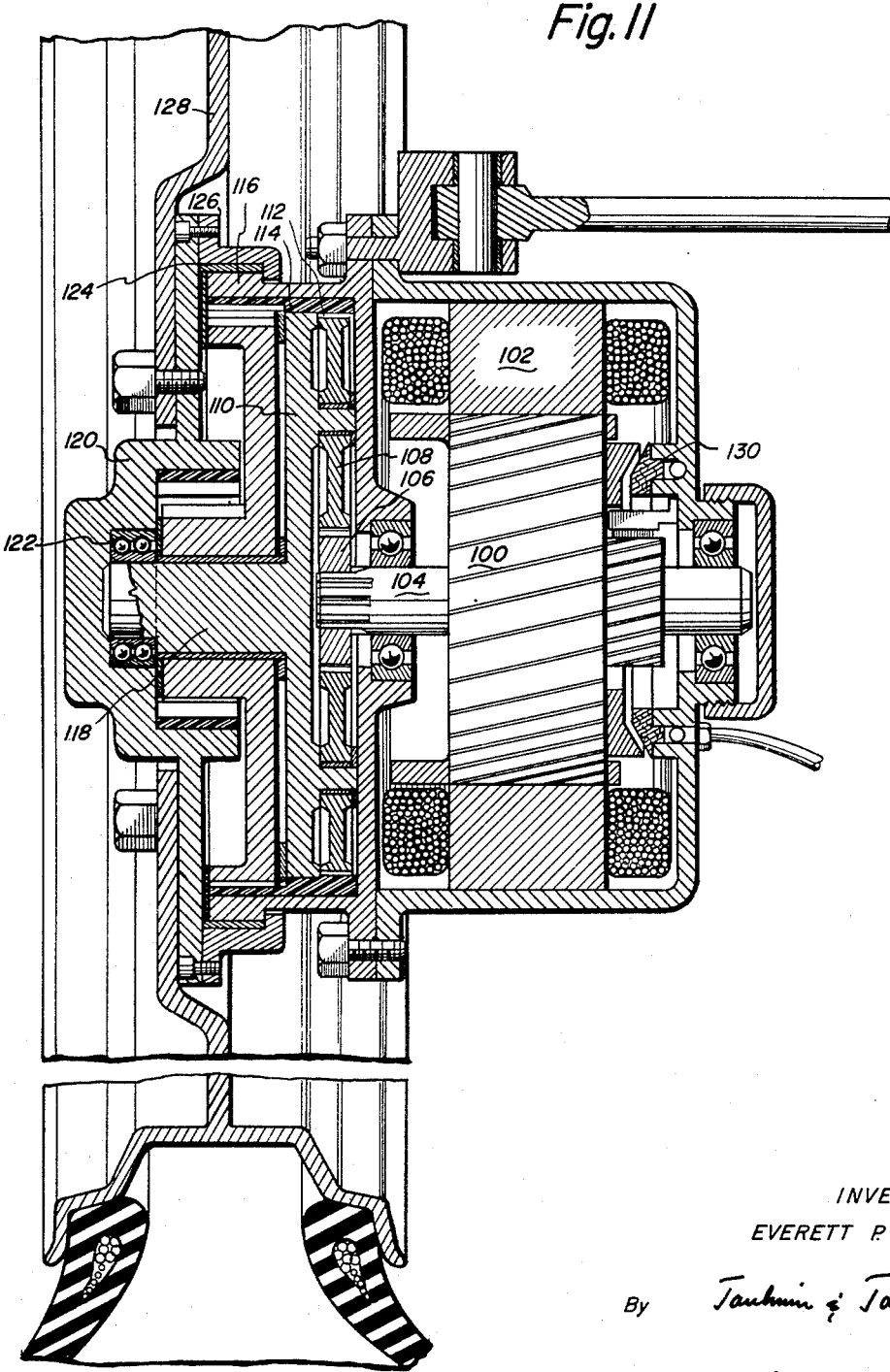
Figure 11 is a vertical sectional view somewhat diagrammatic in nature showing one form of my invention adapted for driving a vehicle wheel.
Figure 12:
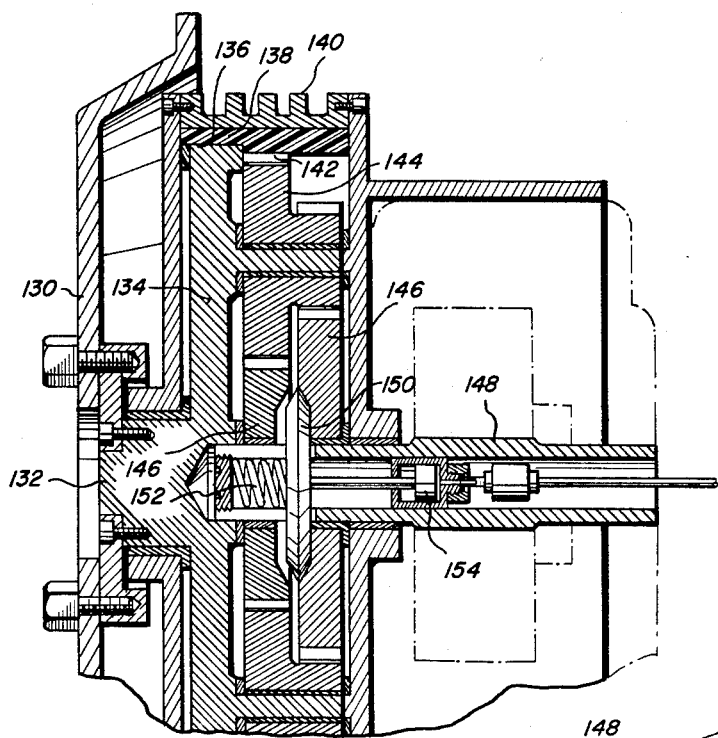
Figure 12 is a fragmentary view of an arrangement similar to the one shown in Figure 11, but illustrating the use of dual input sun gears and compound planetary gears associated with a clutch for selecting between the sun gears for effecting changes in the speed ratio of the power transmission unit.

In Figure 11 there is an electric motor comprising an armature or rotor 100 mounted within a stationary field 102. The motor output shaft 104 drives a sun gear 106 that, in turn, drives planet pinions 108 mounted on a carrier 110, and with the planet pinions meshing with the internal gear portions 112 of a resilient member 114 formed inside a rigid metallic case 116, which may also comprise one end wall of the electric motor.

The carrier 110, similarly to the modification of Figure 3, has an eccentric 118 that actuates a compound epicyclic gear set also of about the same nature as disclosed in Figure 3. The smaller of the internal gears of the compound epicyclic gear set is formed within an end member 120 of the transmission, and within which end member the bearing 122 supports the short shaft projecting from the outer end of eccentric 118. End member 120 extends outwardly beyond case 116 and is journalled thereon by bearing 124 located within ring 126 which is attached to end member 120.

End member 120 also supports the vehicle wheel 128 to complete the assembly. According to the present invention the electric motor may comprise a brake 130 adapted for hydraulic or electric actuation, whereby the vehicle wheel is braked by way of the transmission as well as driven.

The arrangement of Figure 11 can be utilized with a variable speed motor utilizing a wound rotor or an armature, or the motor may comprise a multispeed polyphase induction motor. In this manner a fair range of driving speed can be had; such a range being adequate for most tractors and earth-moving equipment.

A further modification of the present invention, also adapted for a vehicle wheel drive, is shown in Figure 12 wherein the vehicle wheel 130 is attached to the output shaft 132 which is formed on the planet carrier 134 journalled in a cylindrical part 136 with a resilient plastic member 138 in case 140, which member also comprises an internal ring gear portion 142.

Meshing with ring gear 142 are the larger parts of planet pinions 144 carried by carrier 134. The compound planet pinions mesh with the sun gears 146 which are rotatable about an input shaft 148. Located between the two sun gears and selectively engageable therewith is a clutch member 150 urged by spring 152 toward the larger of the sun gears and adapted for being pushed by hydraulic plunger 154 away from the larger sun gear and into engagement with the smaller sun gear.

Figure 13:
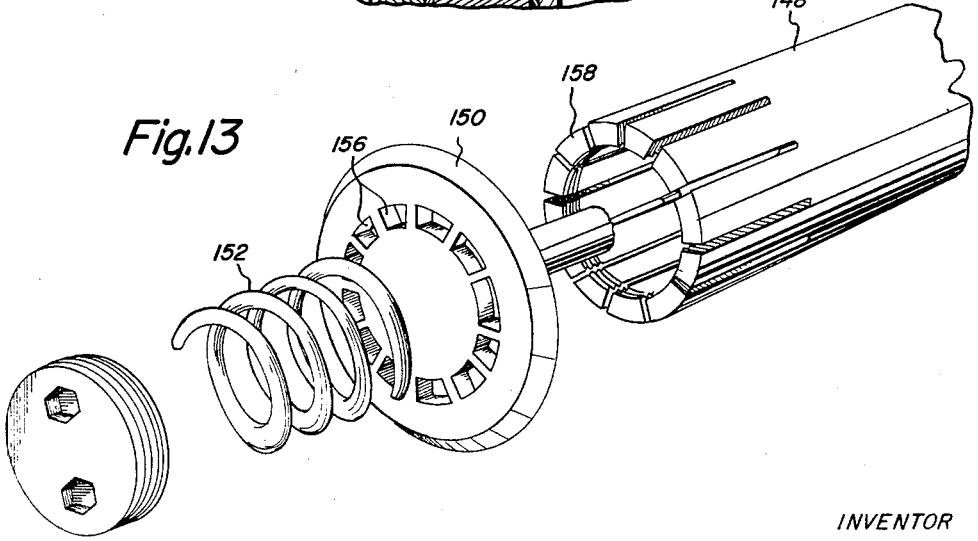
Figure 13 is a perspective view showing an embodiment which the clutch of Figure 12 might take.

As will be seen in Figure 13, clutch member 150 is drivingly mounted on the end of input shaft 148 by providing the clutch member with holes 156 to receive fingers 158 on the end of said shaft.

The arrangement of Figure 12 provides a ready means for selecting between two speed ranges, and this could be utilized in connection with substantially any of the forms of this transmission wherein a planetary gear set is utilized, or could be used, in combination with the multiple speed motor of Figure 11.

A transmission according to the present invention can take many forms and may be either single or multiple planetary units or single or multiple epicyclic units, or a combination of planetary and epicyclic gear sets, and in every case the particular advantages of the present invention are obtained by utilizing a resilient gear where internal and external gears run together.

While a preferred form of the transmission is that in which all of the gearing is contained within a single housing, from which there extend input and output shafts, the transmission can also be constructed of an integral part of an electric motor, such as an arrangement where a part of the gear sets is located at one end of the motor and another part is located at the opposite end thereof, with a connection being made between the gear sets by way of a shaft extending through a hollow rotor supporting shaft.

In the form of the transmission in which all of the gear sets are contained within a single housing the problem of lubrication has been reduced to a minimum and, in particular, where sintered elements can be employed such as sintered carriers impregnated with stable lubricants such as silicons. Metallic elements throughout the transmission can be journalled in plastic bearings, such as nylon, although antifriction bearings and conventional bronze sleeve bearings can be employed if desired.

The invention has been illustrated and described with the plastic material employed as nylon. This material has proved to be satisfactory for these purposes, and is characterized in part by a compressive strength of about 13,000 p.s.i. and a flexural strength of about 13,800 p.s.i., and having a modulus elasticity of about $10^5$ p.s.i. in tension.

A large number of other plastic materials fall within this general range, and such materials include polymonochloro and tryflauro ethylene, sold commercially as Kel–F, and polyester resin, vinyl chloride acetate molding compound and vinyl formal compound, the latter being sold commercially as Formvar. Modified isomerized rubber and glyceral phthalate would likewise be suitable materials or analine formaldehyde molding compound.

The materials referred to above all consist of the necessary strength characteristics, and will operate satisfactorily in the presence of proper lubricating means.

It is to be understood, however, that the present invention is not to be limited to a plastic material, but may be produced to advantage by all metal gears and the particular features of compactness, great load capacity, and a wide range of speed changes would still be obtained. Such arrangement would be practical where shock loads were absent.

It will be understood that this invention is susceptible to modification in order to adapt it to different usages and conditions, and accordingly it is desired to comprehend such modifications within this invention as may fall within the scope of the appended claims.

I claim:

1. In a power transmission unit; a case having a cylindrical cavity therein, end covers closing the opposite ends of said cavity, input and output shafts extending through said covers on the axis of said cavity, and epicyclic gear means in the cavity positively drivingly interconnecting said shafts, said epicyclic means comprising a planetary gear set adjacent the input shaft having a sun gear connected with the input shaft, a plurality of planet gears meshing with the sun gear, a resilient plastic element within the cavity and bonded along its entire length to the wall of the wall of the casing, said element having an internal gear portion with which said planet gears mesh, a planet carrier rotatably supporting said planet gears and being rotatable within said case, said planet carrier comprising a cylindrical journal portion about its outer periphery and said plastic element having a bearing for receiving said journal portion, and means drivingly connecting said planet carrier with said output shaft.

2. In a power transmission unit; a case member having a cylindrical bore therethrough, cover members mounted on opposite ends of the case closing the ends of the cavity, input and output shafts extending through the cover members on the axis of said cavity, a planetary gear set adjacent the input shaft in the cavity comprising a sun gear driven by the input shaft, planet gears meshing with the sun gear, a planet carrier rotatably supporting said planet gears and rotatable within the cavity, a resilient plastic sleeve-like member located within the cavity and bonded directly to the wall thereof, said sleeve-like element comprising an internal gear portion in one end with which said planet gears mesh and a bearing portion adjacent thereto engaging the outer periphery of said carrier, and epicyclic gear means connecting said carrier with said output shaft, said epicyclic gear means comprising a second internal gear portion formed on said resilient sleeve-like element.

3. In a power transmission unit; a case member having a cylindrical bore therethrough, cover members mounted on opposite ends of the case closing the ends of the cavity, input and output shafts extending through the cover members on the axis of said cavity, a planetary gear set adjacent the input shaft in the cavity comprising a sun gear driven by the input shaft, planet gears meshing with the sun gear, a planet carrier rotatably supporting said planet gears and rotatable within the cavity, a resilient plastic sleeve-like member located within the cavity and bonded directly to the wall thereof, said sleeve-like element comprising an internal gear portion in one end with which said planet gears mesh and a bearing portion adjacent thereto engaging the outer periphery of said carrier, and epicyclic gear means connecting said carrier with said output shaft, said epicyclic gear means comprising an internal gear portion formed on said resilient plastic sleeve-like element, an external gear slightly less in diameter than the said internal gear meshing therewith, an eccentric portion projecting from said planet carrier supporting said external gear, and a driving connection between said external gear and said output shaft.

4. In a power transmission unit; a case member having a cylindrical bore therethrough, cover members mounted on opposite ends of the case closing the ends of the cavity, input and output shafts extending through the cover members on the axis of said cavity, a planetary gear set adjacent the input shaft in the cavity comprising a sun gear driven by the input shaft, planet gears meshing with the sun gear, a planet carrier rotatably supporting said planet gears and rotatable within the cavity, a resilient plastic sleeve-like member located within the cavity and bonded directly to the wall thereof, said sleeve-like element comprising an internal gear portion in one end with which said planet gears mesh and a bearing portion adjacent thereto engaging the outer periphery of said carrier, and epicyclic gear means connecting said carrier with said output shaft, said epicyclic gear means comprising an internal gear portion formed on said resilient plastic sleeve-like element, an external gear slightly less in diameter than the said internal gear meshing therewith, an eccentric portion projecting from said planet carrier supporting said external gear, and a driving connection between said external gear and said output shaft, said driving connection comprising an internal gear within the case connected with the output shaft and an external gear integral with said previously mentioned external gear meshing therewith.

5. In a power transmission unit; a case member having a cylindrical bore therethrough, cover members mounted on opposite ends of the case closing the ends of the cavity, input and output shafts extending through the cover members on the axis of said cavity, a planetary gear set adjacent the input shaft in the cavity comprising a sun gear driven by the input shaft, planet gears meshing with the sun gear, a planet carrier rotatably supporting said planet gears and rotatable within the cavity, a resilient plastic sleeve-like member located within the cavity and bonded directly to the wall thereof, said sleeve-like element comprising an internal gear portion in one end with which said planet gears mesh and a bearing portion adjacent thereto engaging the outer periphery of said carrier, and epicyclic gear means connecting said carrier with said output shaft, said epicyclic gear means comprising an internal gear portion formed on said resilient plastic sleeve-like element, an external gear slightly less in diameter than the said internal gear meshing therewith, an eccentric portion projecting from said planet carrier supporting said external gear, a driving connection between said external gear and said output shaft, said driving connection comprising a second internal gear within the case connected with the output shaft and a second external gear integral with said previously mentioned external gear meshing with the second internal gear, said second internal gear having a journal portion integral therewith engaging said resilient sleeve-like element, and the said eccentric on said planet carrier having a shaft portion on the axis of the output shaft journalled in the inner end of said output shaft.

6. In a power transmission unit; a casing having a cylindrical bore therethrough and end covers closing the opposite ends of said bore, input and output shafts extending through said covers on the axis of said bore, and epicyclic gearing positively drivingly interconnecting said input and output shafts, said epicyclic gearing including an internal gear mounted within said casing, said internal gear comprising teeth formed about the inside of a resilient plastic element within said casing and bonded directly to the wall thereof, compound external gear means comprising a larger gear of slightly smaller diameter than the said internal gear and meshing therewith, a second internal gear meshing with the smaller of said external gears and having the same difference in diameter therefrom as exists betweeen the first-mentioned internal gear and its meshing external gear, said second internal gear comprising a resilient plastic material, a circular flange carrried by the output shaft and within which said second internal gear is mounted, and eccentric means driven by said input shaft and supporting said compound external gears.

7. In a power transmission unit; a casing having a cylindrical bore therethrough and end covers closing the opposite ends of said bore, input and output shafts extending through said covers on the axis of said bore, and epicyclic gearing positively drivingly interconnecting said input and output shafts, said epicyclic gearing including an internal gear mounted within said casing, said internal gear comprising teeth formed about the inside of a resilient plastic element within said casing bonded directly to the wall thereof, compound external gear means comprising a larger gear of slightly smaller diameter than the said internal gear and meshing therewith, a second internal gear meshing with the smaller of said external gears and having the same difference in diameter therefrom as exists between the first-mentioned internal gear and its meshing external gear, said second internal gear comprising a resilient plastic material, a circular flange carried by the output shaft and within which said second internal gear is mounted, and eccentric means driven by said input shaft and supporting said compound external gears, the said flange means connected with said output shaft including means disposed radially outwardly therefrom rotatably supported within the said plastic member molded within the casing.

8. In combination; an electric motor, a speed reducing unit directly connected with the motor comprising a case, an output member extending from the case on the side opposite the motor, and epicyclic gear means within the case connecting the motor shaft with said output member, and said epicyclic gear means comprising at least one internal gear within the case, said internal gear comprising resilient plastic material inside said case bonded directly thereto, and said resilient plastic material likewise providing a bearing surface for rotating elements of said gear means for sustaining radial thrusts thereon.

9. In a power transmission unit; a case member having a cylindrical bore therethrough, cover members mounted on opposite ends of the case closing the ends of the cavity, input and output shafts extending through the cover member on the axis of said cavity, a planetary gear set adjacent the input shaft in the cavity comprising a sun gear driven by the input shaft, planet gears meshing with the sun gear, a planet carrier rotatably supporting said resilient plastic sleeve-like member located within the cavity and bonded directly to the wall thereof, said sleeve-like element comprising an internal gear portion in one end with which said planet gears mesh and a bearing portion adjacent thereto engaging the outer periphery of said carrier, and epicyclic gear means connecting said carrier with said output shaft comprising a second sun gear driven by the planet carrier, second planet gear means meshing with said second sun gear, a second planet carrier rotatably supporting said second planet gear means and rotatable within the case, said sleeve-like element comprising a second internal gear portion meshing with said second planet gear means and a second bearing portion engaged by said second planet carrier, said second planet carrier being connected with said output shaft.

10. In a power transmission unit; a case member having a cylindrical bore therethrough, cover members mounted on opposite ends of the case closing the ends of the cavity, input and output shafts extending through the cover members on the axis of said cavity, a planetary gear set adjacent the input shaft in the cavity comprising a sun gear driven by the input shaft, planet gears meshing with the sun gear, a planet carrier rotatably supporting said planet gears and rotatable within the cavity, a resilient plastic sleeve-like member located within the cavity and bonded directly to the wall thereof, said sleeve-like member comprising an internal gear portion in one end with which said planet gears mesh and a bearing portion adjacent thereto engaging the outer periphery of said carrier, and epicyclic gear means connecting said carrier with said output shaft comprising a second sun gear driven by the planet carrier, second planet gear means meshing with said second sun gear, a second planet carrier rotatably supporting said second planet gear means and rotatable within the case, said sleeve-like element comprising a second internal gear portion meshing with said second planet gear means and a second bearing portion engaged by said second planet carrier, said second planet carrier being connected with said output shaft, the diameters of said internal gear portions and bearing portions increasing progressively toward one end of the case to permit disassembly of the unit from the said one end of the case.

References Cited in the file of this patent

UNITED STATES PATENTS

| | | |
|---|---|---|
| 1,190,278 | Foote | July 11, 1916 |
| 1,831,577 | Richer | Nov. 10, 1931 |
| 2,189,776 | Bowen | Feb. 13, 1940 |
| 2,408,993 | Nardone | Oct. 8, 1946 |
| 2,418,351 | Jackson | Apr. 1, 1947 |
| 2,737,064 | Stoeckicht | Mar. 6, 1956 |

FOREIGN PATENTS

| | | |
|---|---|---|
| 397,338 | Great Britain | Aug. 24, 1933 |
| 890,697 | France | Feb. 3, 1943 |
| 164,208 | Austria | Oct. 25, 1949 |
| 65,679 | France | Nov. 2, 1955 |

OTHER REFERENCES

Publication: Machine Design, pp. 153–159, March 1954.